United States Patent
Irving et al.

(10) Patent No.: US 7,581,117 B1
(45) Date of Patent: Aug. 25, 2009

(54) METHOD FOR SECURE DELIVERY OF CONFIGURATION DATA FOR A PROGRAMMABLE LOGIC DEVICE

(75) Inventors: Kenneth Irving, Sunnyvale, CA (US); Jonathan Greene, Palo Alto, CA (US)

(73) Assignee: Actel Corporation, Mountain View, CA (US)

( * ) Notice: Subject to any disclaimer, the term of this patent is extended or adjusted under 35 U.S.C. 154(b) by 847 days.

(21) Appl. No.: 11/185,427

(22) Filed: Jul. 19, 2005

(51) Int. Cl.
*H04L 9/32* (2006.01)

(52) U.S. Cl. .................. 713/189; 713/181; 713/168; 726/8

(58) Field of Classification Search .......... None
See application file for complete search history.

(56) References Cited

U.S. PATENT DOCUMENTS

| | | | |
|---|---|---|---|
| 4,583,196 A | 4/1986 | Koo | 364/900 |
| 4,812,675 A | 3/1989 | Goetting | 307/443 |
| 4,852,044 A | 7/1989 | Turner et al. | 364/900 |
| 4,887,239 A | 12/1989 | Turner | 365/185 |
| 5,349,249 A | 9/1994 | Chiang et al. | 307/465 |
| 5,440,508 A | 8/1995 | Pathak et al. | 365/154 |
| 5,452,355 A | 9/1995 | Coli | 380/4 |
| 5,768,372 A | 6/1998 | Sung et al. | 380/3 |
| 5,784,577 A | 7/1998 | Jacobson et al. | 395/284 |
| 5,898,776 A | 4/1999 | Apland et al. | 380/3 |
| 5,911,778 A | 6/1999 | Garnett | 713/200 |
| 5,915,017 A | 6/1999 | Sung et al. | 380/3 |
| 5,946,478 A | 8/1999 | Lawman | 395/500.18 |
| 5,970,142 A | 10/1999 | Erickson | 380/21 |
| 6,020,633 A | 2/2000 | Erickson | 257/723 |
| 6,072,328 A | 6/2000 | Takuma | 326/8 |
| 6,076,149 A | 6/2000 | Usami et al. | 711/163 |
| 6,089,460 A | 7/2000 | Hazama | 235/492 |
| 6,118,869 A | 9/2000 | Kelem et al. | 380/44 |
| 6,212,639 B1 | 4/2001 | Erickson et al. | 713/200 |
| 6,260,172 B1 | 7/2001 | Hazama | 714/773 |
| 6,301,695 B1 | 10/2001 | Burnham et al. | 716/16 |
| 6,331,784 B1 | 12/2001 | Mason et al. | 326/8 |
| 6,356,637 B1 | 3/2002 | Garnett | 380/265 |
| 6,357,037 B1 | 3/2002 | Burnham et al. | 716/17 |
| 6,457,125 B1 | 9/2002 | Matthews, Jr. et al. | 713/160 |
| 7,162,644 B1 * | 1/2007 | Trimberger | 713/189 |
| 7,191,342 B1 * | 3/2007 | New et al. | 713/190 |
| 7,215,139 B2 * | 5/2007 | Agrawal et al. | 326/38 |
| 2001/0015919 A1 | 8/2001 | Kean | 365/200 |
| 2001/0037458 A1 | 11/2001 | Kean | 713/193 |
| 2002/0051534 A1 | 5/2002 | Matchett et al. | 380/37 |
| 2002/0150252 A1 | 10/2002 | Wong | 380/277 |

* cited by examiner

*Primary Examiner*—Pramila Parthasarathy
(74) *Attorney, Agent, or Firm*—Lewis and Roca LLP

(57) ABSTRACT

Secure delivery of configuration data of an intellectual property (IP) core includes the steps of loading configuration data for the IP core into IP core space by an IP core provider, masking portions of the IP core space not loaded with configuration data in the loading configuration data step with the value 0 or 1 by the IP core provider, encrypting data in the IP core space by the IP core provider, loading configuration data for system design other than for the IP core into a remainder space and any unused portions of the IP core space by a system designer, masking portions of the IP core space loaded in the loading configuration data step with the value 0 or 1 used by the IP core provider in the masking portions of the IP core space not loaded step, and encrypting data in a configuration space by the system designer.

10 Claims, 5 Drawing Sheets

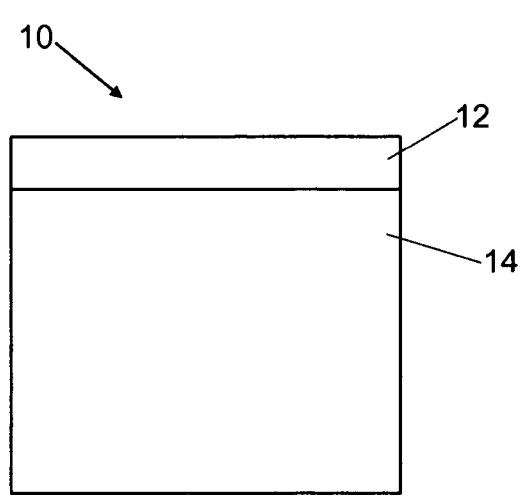

| 0 | 1 | 2 | 3 | ←12 |
|---|---|---|---|---|
| # | # | # | * | |

FIG. 4A

| 0 | 1 | 2 | 3 | ←12 |
|---|---|---|---|---|
| 0 | 1 | 1 | * | |

FIG. 4B

| 0 | 1 | 2 | 3 | ←12 |
|---|---|---|---|---|
| 0 | 1 | 1 | 1 | |

FIG. 4C

| 0 | 1 | 2 | 3 | ←12 |
|---|---|---|---|---|
| E | E | E | E | |

FIG. 4D

| 12 | | | | 14 | | |
|---|---|---|---|---|---|---|
| 0 | 1 | 2 | 3 | 4 | 5 | 6 |
| * | * | * | # | # | # | # |

FIG. 4E

| 12 | | | | 14 | | |
|---|---|---|---|---|---|---|
| 0 | 1 | 2 | 3 | 4 | 5 | 6 |
| * | * | * | 1 | 0 | 0 | 1 |

FIG. 4F

| 12 | | | | 14 | | |
|---|---|---|---|---|---|---|
| 0 | 1 | 2 | 3 | 4 | 5 | 6 |
| 1 | 1 | 1 | 1 | 0 | 0 | 1 |

FIG. 4G

| 12 | | | | 14 | | |
|---|---|---|---|---|---|---|
| 0 | 1 | 2 | 3 | 4 | 5 | 6 |
| E | E | E | E | E | E | E |

FIG. 4H

METHOD FOR SECURE DELIVERY OF CONFIGURATION DATA FOR A PROGRAMMABLE LOGIC DEVICE

BACKGROUND OF THE INVENTION

1. Field of the Invention

The present invention relates to a method of secure delivery of configuration data for a programmable logic device (PLD). More particularly, the present invention provides for encryption by an intellectual property (IP) core provider and decryption by a system designer of an IP core for a PLD.

2. The Background Art

Programmable logic devices (PLDs) are integrated circuit devices which contain gates or other general-purpose cells whose interconnections can be configured by programming to implement nearly any desired combinatorial or sequential function. Field programmable gate arrays (FPGAs) are well known in the PLD art. FPGAs generally include an array of general-purpose logic circuits, typically referred to as logic blocks, which can be programmed by programmable elements to implement virtually any logic function. The programmed logic elements in the gate array are connected together by routing resources to form a desired integrated circuit. The routing resources are connected to each other and to the logic elements in the gate array by programmable elements.

It is well known in the art that both volatile and non-volatile programmable elements have been used to provide interconnection in FPGA devices. Volatile programmable elements are often a pass transistor controlled by a static random access memory (SRAM) cell. Nonvolatile programmable elements include antifuses and floating gate transistors. Programmable antifuse based architectures and reprogrammable SRAM and floating gate memory cell based architectures are well known in the FPGA art.

In an SRAM based reprogrammable FPGA, the programmable elements are typically passgates controlled by information stored in an SRAM configuration memory. In an antifuse based FPGA, the antifuses are programmable elements that are formed by two conductors with a dielectric material sandwiched in between which represent an open state until programmed. The antifuses are disposed to provide the interconnections among the routing resources and to program the programmable logic elements. In a floating gate transistor based FPGA, the floating gates are typically similar to those used in flash memories the operation of which is well known to those of ordinary skill in the art, but adapted for use in programmable arrays.

The FPGA is often programmed by an end user that is typically a system designer. To program the FPGA a bit stream is provided to the FPGA. To prevent the design of the circuit in the FPGA from being known, the bit stream can be encrypted and then decrypted by a cryptographic engine embedded in the FPGA. Many such encryption/decryption schemes are well known to those of ordinary skill in the art. In this manner a system designer that has designed the circuit being implemented in the FPGA is able to protect the circuit design from being appropriated by others.

In many instances, however, as the design of the circuits being implemented in an FPGA are more complex, the end user of an FPGA is often a system designer that has not created all of the circuits that are being implemented in the FPGA. Some of the circuits may be intellectual property (IP) cores developed by an IP provider that licenses the IP core to end user. Increasingly, the IP provider is a third party that is neither the manufacturer of the FPGA nor the end user. Often the terms of the license agreement between the third party IP provider and the end user provide for payment on a per use basis of the IP core by the end user.

It will be appreciated that it is important to the IP provider that the IP core is not used by the end user or others without proper payment being made. The IP core provider must either have some scheme for limiting the number of times the IP core can be used or it must have some scheme for accounting for the number of times the core has been used. The IP provider is also concerned that the IP core cannot be appropriated and sold to others or modified and sold to others.

Unlike the system designer who creates the circuit to be implemented in the FPGA, the system designer who employs an IP core provided by an IP provider requires specific information about the IP core. The IP core provider must provide the IP user with both simulation models to validate that the IP core has been properly integrated into the system designer's design and a description of the hardware implementation so that the system designer can efficiently use the IP core and also time the IP core appropriately to the remainder of the design implemented in the FPGA.

Although the specific information of the simulation model will not provide the system designer with enough information to appropriate the IP core, a description of the hardware implementation in the form of even an obfuscated or encrypted netlist will supply a determined individual with enough information to appropriate the IP core. The information required by the system designer to efficiently use and time the IP core is both the location of allocated but unused resources in the IP core and the location of the ports in the IP core that the system designer must connect to the remainder of the design implemented in the FPGA.

BRIEF DESCRIPTION OF THE INVENTION

According to a first embodiment of the present invention, a method of secure delivery of configuration data of an intellectual property (IP) core includes the steps of loading configuration data for the IP core into an IP core space by an IP core provider, masking portions of the IP core space not loaded with configuration data in the loading configuration data step with either the value 0 or 1 by the IP provider, encrypting data in the IP core space by the IP provider, and loading configuration data for a system design other than for the IP core into a remainder space and any unused portions of the IP core space by a system designer, masking portions of the IP core space loaded in the loading configuration data step with either the value 0 or 1 used by the IP provider in the masking portions of the IP core space not loaded step.

According to a second embodiment of the present invention, a method of secure delivery of configuration data of an intellectual property (IP) core includes the steps of loading configuration data for the IP core into an IP core space by an IP core provider, masking portions of the IP core space not loaded with configuration data in the loading configuration data step with either the value 0 or 1 by the IP provider, encrypting data in the IP core space by the IP provider, loading configuration data for a system design other than for the IP core into a remainder space and any unused portions of the IP core space by a system designer, masking portions of the IP core space loaded in the loading configuration data step with either the value 0 or 1 used by the IP provider in the masking portions of the IP core space not loaded step, and encrypting data in a configuration space by the system designer.

According to a third embodiment of the present invention, a method of controlling use of an intellectual property (IP) core includes the steps of programming a desired number of PLD devices with a private decryption key by a PLD manufacturer, providing a purchaser of the devices a public encryption key, transferring the public key from the purchaser to an IP provider to encrypt an IP core, and providing a database by the PLD device manufacturer indicating the desired number of PLD devices that have been programmed with the private decryption key.

According to a fourth embodiment of the present invention, a method of controlling use of an intellectual property (IP) core including the steps of programming PLD devices by a manufacturer with a secret key, supplying serial numbers of the devices by a purchaser of the devices to an IP core provider, obtaining from the manufacturer the secret key by the IP core provider, modifying the IP core bit stream with the serial numbers, and encrypting the modified IP core bit stream with the secret key.

BRIEF DESCRIPTION OF THE DRAWINGS

FIG. 1 illustrates in block diagram a configuration space according to the present invention.

FIGS. 2A-2G illustrate bits in the configuration space according to a first embodiment of the present invention.

FIGS. 4A-4H illustrate bits in the configuration space according to a second embodiment of the present invention.

DETAILED DESCRIPTION OF A PREFERRED EMBODIMENT

Figure 3:
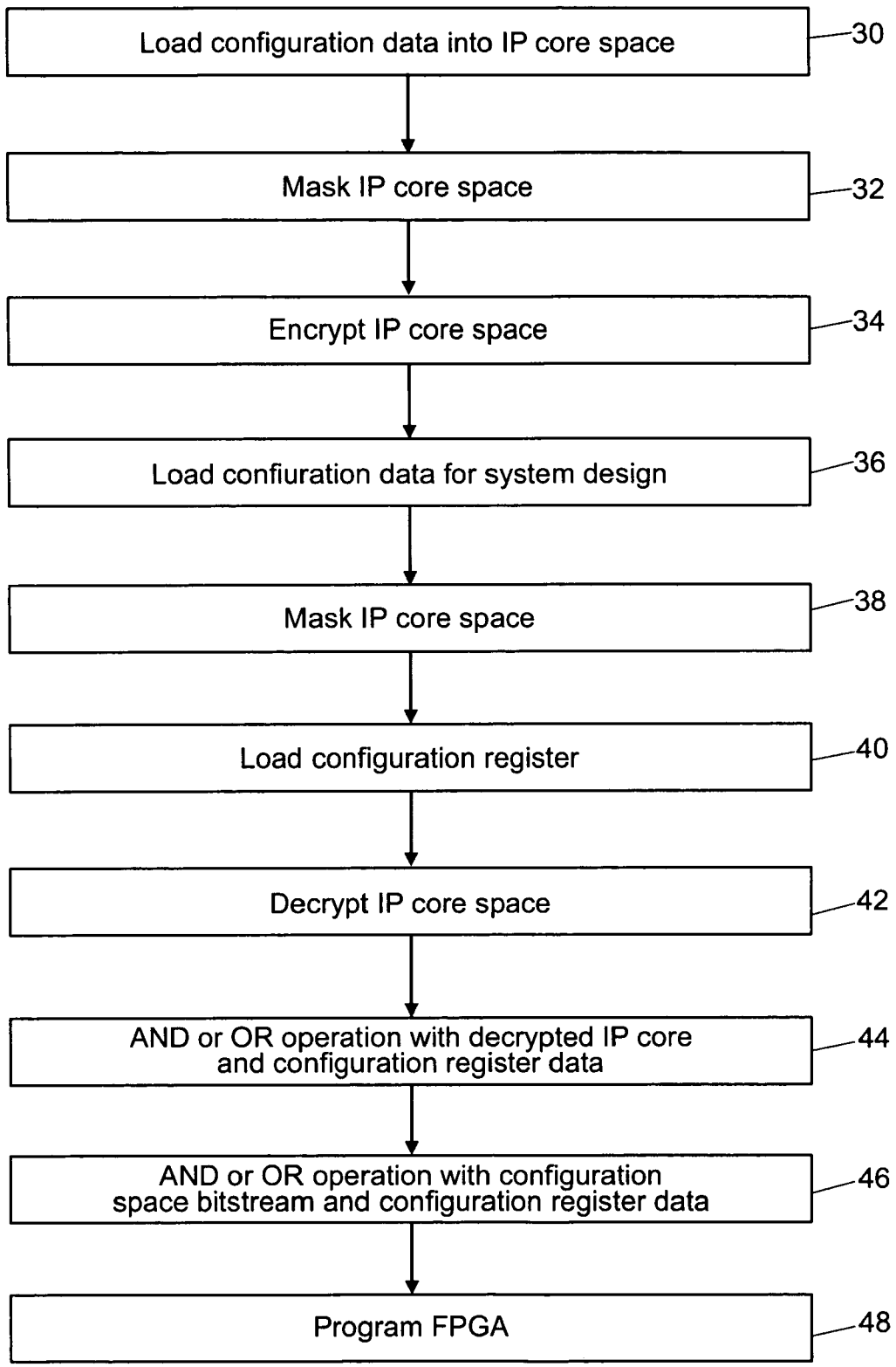
FIG. 3 is a flow diagram of encrypting and decrypting an IP core according to a first embodiment of the present invention.

Those of ordinary skill in the art will realize that the following description of the present invention is illustrative only and not in any way limiting. Other embodiments of the invention will readily suggest themselves to such skilled persons.

Generally, in a reprogrammable FPGA architecture suitable for incorporating the present invention, there is included an array of programmable logic blocks, routing resources for connecting the programmable logic blocks together, an array of routing switch memory cells whose contents are employed to connect the routing resources together, and static configuration memory cells for programming the logic devices.

Each programmable element in the FPGA corresponds to a bit in a configuration data bit stream. The bits in this bit stream can be referred to as the configuration space. When an IP core is employed by a system designer, the IP core is assigned a portion of the configuration space, and is provided to the system designer in some medium as a bit stream. In FIG. 1, a block diagram depicts the configuration space 10 and a first portion of the configuration space 10 that will be referred to as IP core space 12 according to the present invention. FIG. 1 also depicts a second portion of the configuration space 10 that will be referred to as the remainder space 14. The remainder space 14 is the portion of the configuration space 10 not assigned to the IP core space 12. It should be appreciated by those of ordinary skill in the art that additional space from the remainder space 14 may be assigned to other IP cores by the system designer in accordance with the present invention.

Although the entire IP core space 12 has been assigned to the implementation of the IP core, it should be appreciated there are portions of the IP core space 12 that are not used to implement the IP core. To efficiently utilize the resources of the FPGA, it is important for the system designer to be able to make use of the resources in the IP core space 12 not used by the IP core for other purposes in the system design. This efficiency is important not simply because it improves the use of the logic resources in the FPGA, including the IP core space 12, but also because it makes the IP core porous so that other signals in the overall circuit design may be routed through the portions of the integrated circuit being used for the IP core.

It should be also be appreciated that certain portions of the IP core space 12 implement ports into the IP core that the system designer will need to employ to connect the IP core to the remainder of the system design. Accordingly, the system designer must be provided information as to the location of these ports in the IP core space for use by the system designer.

According to the present invention, the IP core provider will not only provide an encrypted IP core to the system designer, but will also identify to the system designer the portions of the IP core space 12 corresponding to the resources on the FPGA that are not being employed to implement the IP core and the portions of the IP core space 12 that implement the ports into the IP core needed by the system designer to integrate the IP core into the remainder of the system design.

Turning now to FIGS. 2A-2D, the IP core space 12 of FIG. 1 is illustrated by bits 0-3 according to a first embodiment of the present invention.

In FIG. 2A, bits 0, 1 and 2 are marked by the pound sign (#) to indicate that bits 0, 1 and 2 are being employed in the IP core space 12 to implement the IP core, and bit 3 is marked by a star (*) to indicate that although it is a bit that is within the IP core space 12 it is not being employed in the IP core space 12 to implement the IP core. It will be readily appreciated by those of ordinary skill in the art that the three bits 0, 1 and 2 are employed merely to illustrate bits in the IP core space being used to implement the IP core and that as actual IP core implementation would involve many more bits, and further that there would be far more than a single bit in the IP core space 12 that would be unused in the implementation of the IP core.

In FIG. 2B, bits 0, 1 and 2 are shown with illustrative values 0, 1 and 1, respectively, and bit 3 is still shown as not being used. It should be appreciated by those of ordinary skill in the art that values in bits 0, 1 and 2 constitute data for configuring the elements in the FPGA to implement the circuit provided by the IP core.

In FIG. 2C, the unused bit 3 in the IP core space 12 has been masked with a value of 1. Any other unused bits in the IP core space 12 would have also been masked with the value of 1. Alternatively, all of the unused bits in the IP core space 12, including unused bit 3, could have masked with a value of 0. Masking the unused bits in the IP core space 12 with either the value of 0 or 1 will affect the manner in which the IP core space 12 is combined with the remainder space 14 as will be described below.

In FIG. 2D, according to the present invention, bits 0, 1, 2 and 3 in the IP core space 12 have been encrypted. To avoid overcomplicating the disclosure and thereby obscuring the present invention, no scheme for encrypting the IP core space 12 is described herein. It should be readily appreciated that numerous schemes for encrypting bit streams well known to those of ordinary skill in art are suitable for use according to the present invention. After the IP core has been encrypted, it is provided to the system designer. As described above, along with the encrypted IP core, the portions of the IP core space 12 which provide ports into the IP core and the location of the unused bits in the IP core space 12, illustrated by bit 3 in FIGS. 2A through 2D, are identified to the system designer.

Turning now to FIGS. 2E-2G, the remainder space 14 of FIG. 1 is illustrated by bits 4-6 according to a first embodiment of the present invention. Also illustrated are the bits 0-3 from FIGS. 2A-2C.

In FIG. 2E, bits 3, 4, 5 and 6 are marked by the pound sign (#) to indicate that bits 3, 4, 5 and 6 are being employed by the system designer to implement portions of the system design not including the IP core, and bits 0, 1, and 2 are marked by a star (*) to indicate that they are being employed in the IP core space 12 to implement the IP core. It will be readily appreciated by those of ordinary skill in the art that the four bits 3, 4, 5 and 6 are employed merely to illustrate bits not used in the IP core space 12 or found in the remainder space 14 being used to implement the portions of the system design other than the IP core and that as actual implementation would involve many more bits.

In FIG. 2F, bits 3, 4, 5 and 6 are shown with illustrative values 1, 0, 0 and 1, respectively, and bits 0, 1 and 2 are still shown as not being used in the non-IP core portion of the system design. It should be appreciated by those of ordinary skill in the art that illustrative values for bits 3, 4, 5 and 6 constitute data for configuring the elements in the FPGA to implement the system design of other than that of the IP core.

In FIG. 2G, according to the present invention, bits 0, 1 and 2 in the IP core space 12 have been masked with a value of 1. Alternatively, bits 0, 1 and 2 in the IP core space 12 used to implement the IP core, could have masked with a value of 0. Masking the used bits in the IP core space 12 with either the value of 0 or 1 will affect the manner in which the IP core space 12 is combined with the remainder space 14 as will be described below.

In FIG. 3, a flow diagram according to the present invention illustrates the steps depicted in FIGS. 2A-2G, and further describes the remaining steps according to the first embodiment of the present invention.

At step 30, configuration data for the IP core is loaded into the IP core space 12 by the IP provider.

At step 32, any portions of the IP core space 12 that are not loaded with configuration data are masked with either the value 0 or 1 by the IP provider.

At step 34, the IP core space 12 is encrypted by the IP provider, and the encrypted IP core space 12 along with identification of the portions of the IP core space 12 representing the ports into the IP core and the unused portions of the IP core space 12 are provided to the system designer.

At step 36, configuration data for the system design other than for the IP core is loaded into the remainder space 14 and any unused portions of the IP core space 12 by the system designer.

At step 38, the portions of the IP core space 12 employed by the IP provider are masked by the system designer with either the value 0 or 1 used by the IP provider in step 32.

At step 40, a configuration register is loaded with all 0s if the mask value in steps 32 and 38 was 0 and with all 1s if the mask value in steps 32 and 38 was 1.

At step 42, the IP core space 12 is decrypted by the FPGA with a secret key programmed into the FPGA.

At step 44, either an AND operation is performed with the decrypted IP core space 12 bit stream and the data in the configuration register and stored in the configuration register if the mask value was a 1, or an OR operation is performed with the decrypted IP core space bit stream and the data in the configuration register and stored in the configuration register if the mask value was a 0.

At step 46, either an AND operation is performed with the configuration space 10 bit stream formed in steps 36 and 38 and the data in the configuration register and stored in the configuration register if the mask value was a 1, or an OR operation is performed with the configuration space 10 bit stream formed in steps 36 and 38 and the data in the configuration register and stored in the configuration register if the mask value was a 0.

At step 48, the data in the configuration register is then used to program the FPGA.

Turning now to FIGS. 4A-4D, the IP core space 12 of FIG. 1 is illustrated by bits 0-3 according to a second embodiment of the present invention.

In FIG. 4A, bits 0, 1 and 2 are marked by the pound sign (#) to indicate that bits 0, 1 and 2 are being employed in the IP core space 12 to implement the IP core, and bit 3 is marked by a star (*) to indicate that although it is a bit that is within the IP core space 12 it is not being employed in the IP core space 12 to implement the IP core. It will be readily appreciated by those of ordinary skill in the art that the three bits 0, 1 and 2 are employed merely to illustrate bits in the IP core space being used to implement the IP core and that as actual IP core implementation would involve many more bits, and further that there would be far more than a single bit in the IP core space 12 that would be unused in the implementation of the IP core.

In FIG. 4B, bits 0, 1 and 2 are shown with illustrative values 0, 1 and 1, respectively, and bit 3 is still shown as not being used. It should be appreciated by those of ordinary skill in the art that values in bits 0, 1 and 2 constitute data for configuring the elements in the FPGA to implement the circuit provided by the IP core.

In FIG. 4C, the unused bit 3 in the IP core space 12 has been masked with a value of 1. Any other unused bits in the IP core space 12 would have also been masked with the value of 1. Alternatively, all of the unused bits in the IP core space 12, including unused bit 3, could have masked with a value of 0. Masking the unused bits in the IP core space 12 with either the value of 0 or 1 will affect the manner in which the IP core space 12 is combined with the remainder space 14 as will be described below.

In FIG. 4D, according to the present invention, bits 0, 1, 2 and 3 in the IP core space 12 have been encrypted. To avoid overcomplicating the disclosure and thereby obscuring the present invention, no scheme for encrypting the IP core space 12 is described herein. It should be readily appreciated that numerous schemes for encrypting bit streams well known to those of ordinary skill in art are suitable for use according to the present invention. After the IP core has been encrypted, it is provided to the system designer. As described above, along with the encrypted IP core, the portions of the IP core space 12 which provide ports into the IP core and the location of the unused bits in the IP core space 12, illustrated by bit 3 in FIGS. 4A through 4D, are identified to the system designer.

Turning now to FIGS. 4E-4H, the remainder space 14 of FIG. 1 is illustrated by bits 4-6 according to a second embodiment of the present invention. Also illustrated are the bits 0-3 from FIGS. 4A-4C.

In FIG. 4E, bits 3, 4, 5 and 6 are marked by the pound sign (#) to indicate that bits 3, 4, 5 and 6 are being employed by the system designer to implement portions of the system design not including the IP core, and bits 0, 1, and 2 are marked by a star (*) to indicate that they are being employed in the IP core space 12 to implement the IP core. It will be readily appreciated by those of ordinary skill in the art that the four bits 3, 4, 5 and 6 are employed merely to illustrate bits not used in the IP core space 12 or found in the remainder space 14 being used to implement the portions of the system design other than the IP core and that as actual implementation would involve many more bits.

In FIG. 4F, bits 3, 4, 5 and 6 are shown with illustrative values 1, 0, 0 and 1, respectively, and bits 0, 1 and 2 are still shown as not being used in the non-IP core portion of the system design. It should be appreciated by those of ordinary skill in the art that illustrative values for bits 3, 4, 5 and 6 constitute data for configuring the elements in the FPGA to implement the system design of other than that of the IP core.

In FIG. 4G, according to the present invention, bits 0, 1 and 2 in the IP core space 12 have been masked with a value of 1. Alternatively, bits 0, 1 and 2 in the IP core space 12 used to implement the IP core, could have masked with a value of 0. Masking the used bits in the IP core space 12 with either the value of 0 or 1 will affect the manner in which the IP core space 12 is combined with the remainder space 14 as will be described below.

In FIG. 4H, according to the present invention, bits 0, 1, 2, 3, 4, 5 and 6 in the configuration space 10 have been encrypted. To avoid overcomplicating the disclosure and thereby obscuring the present invention, no scheme for encrypting the configuration space 10 is described herein. It should be readily appreciated that numerous schemes for encrypting bit streams well known to those of ordinary skill in art are suitable for use according to the present invention.

Figure 5:
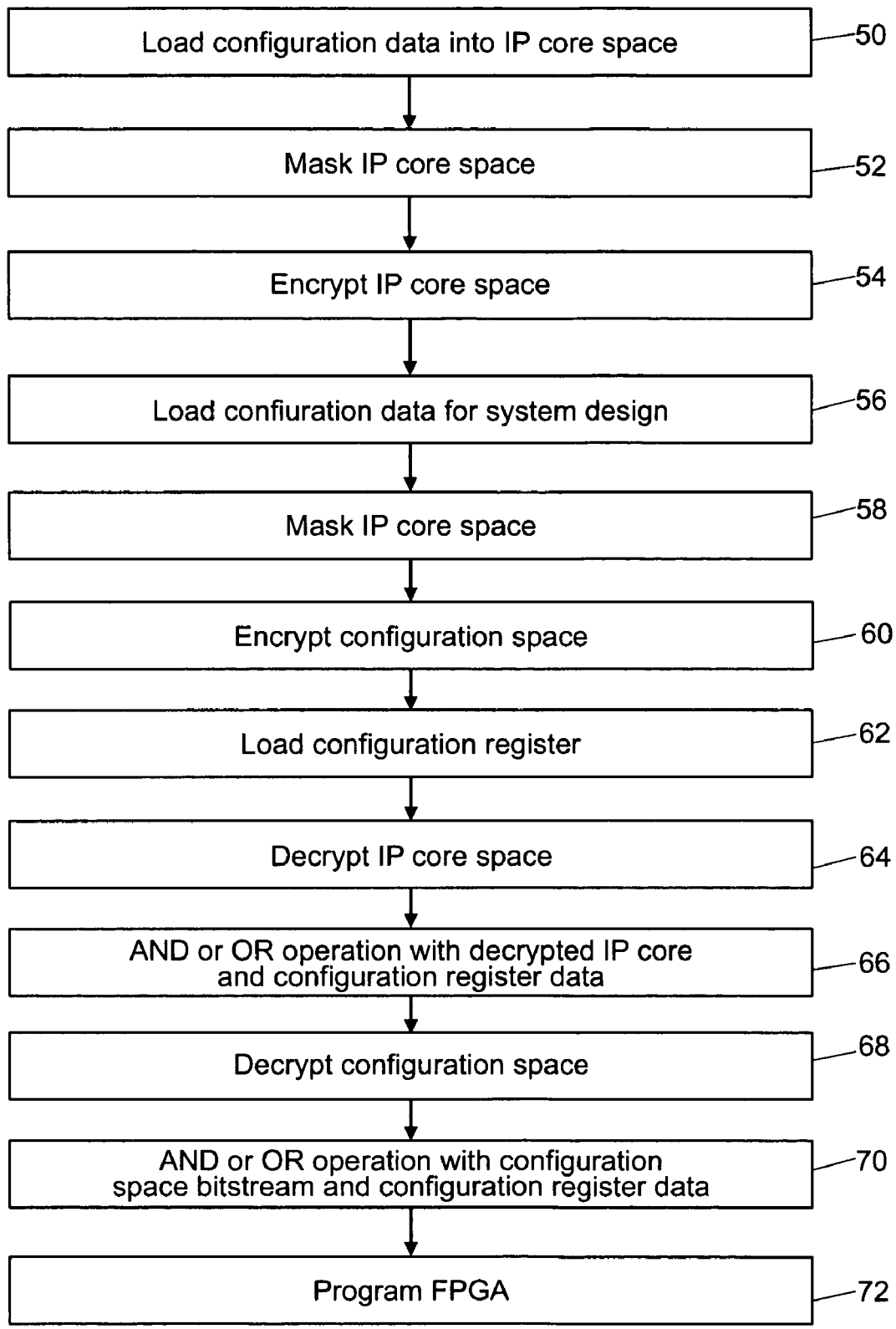
FIG. 5 is a flow diagram of encrypting and decrypting an IP core according to a second embodiment of the present invention.

In FIG. 5, a flow diagram according to the present invention illustrates the steps depicted in FIGS. 4A-4H, and further describes the remaining steps according to the first embodiment of the present invention.

At step 50, configuration data for the IP core is loaded into the IP core space 12 by the IP provider.

At step 52, any portions of the IP core space 12 that are not loaded with configuration data are masked with either the value 0 or 1 by the IP provider.

At step 54, the IP core space 12 is encrypted by the IP provider, and the encrypted IP core space 12 along with identification of the portions of the IP core space 12 representing the ports into the IP core and the unused portions of the IP core space 12 are provided to the system designer.

At step 56, configuration data for the system design other than for the IP core is loaded into the remainder space 14 and any unused portions of the IP core space 12 by the system designer.

At step 58, the portions of the IP core space 12 employed by the IP provider are masked by the system designer with either the value 0 or 1 used by the IP provider in step 52.

At step 60, the configuration space 10 is encrypted by the system designer.

At step 62, a configuration register is loaded with all 0s if the mask value in steps 52 and 58 was 0 and with all is if the mask value in steps 52 and 58 was 1.

At step 64, the IP core space 12 is decrypted by the FPGA with a secret key programmed into the FPGA.

At step 66, either an AND operation is performed with the decrypted IP core space 12 bit stream and the data in the configuration register and stored in the configuration register if the mask value was a 1, or an OR operation is performed with the decrypted IP core space bit stream and the data in the configuration register and stored in the configuration register if the mask value was a 0.

At step 68, the configuration space 10 is decrypted by the FPGA with a secret key programmed into the FPGA.

At step 70, either an AND operation is performed with the decrypted configuration space 10 bit stream and the data in the configuration register and stored in the configuration register if the mask value was a 1, or an OR operation is performed with the decrypted configuration space 10 bit stream and the data in the configuration register and stored in the configuration register if the mask value was a 0.

At step 72, the data in the configuration register is then used to program the FPGA.

According to the present invention, in addition to providing the system designer an encrypted core that he can use efficiently and satisfactorily integrate into the overall system design, there are several methods to ensure that the system designer only uses the encrypted core the number of times for which payment has been made.

In a first method, the PLD devices to which the IP cores are being supplied are programmed by or at the direction of the IP provider with a secret decryption key that only the IP provider knows.

Figure 6:
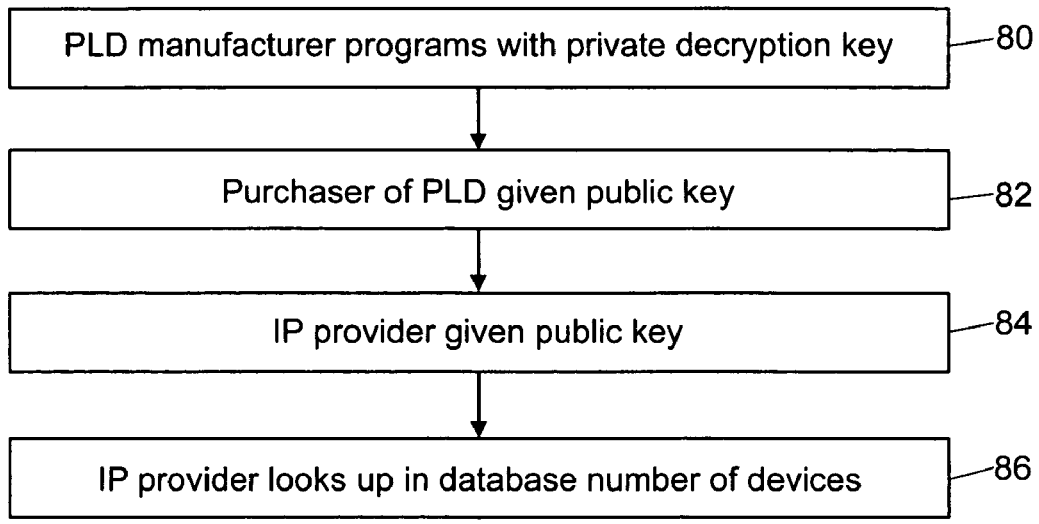
FIG. 6 is a flow diagram of a public key encryption method in according to the present invention.

In a second method described with respect to a flow diagram in FIG. 6 according to the present invention, a public key method is employed that does not directly involve the IP provider in setting the secret decryption key within the PLD. In this method, at step 80, the PLD manufacturer will program a desired number of PLD devices with a private decryption key. At step 82, the purchaser of these devices will then be given a public encryption key. At step 84, when the purchaser of the devices desires to incorporate an IP core from a provider, the public key is given to the IP provider to encrypt the IP core. At step 86, the IP provider can then look up in a manufacturer's database the number of devices that have been programmed with private decryption key corresponding to the public key, and charge the customer accordingly.

Figure 7:
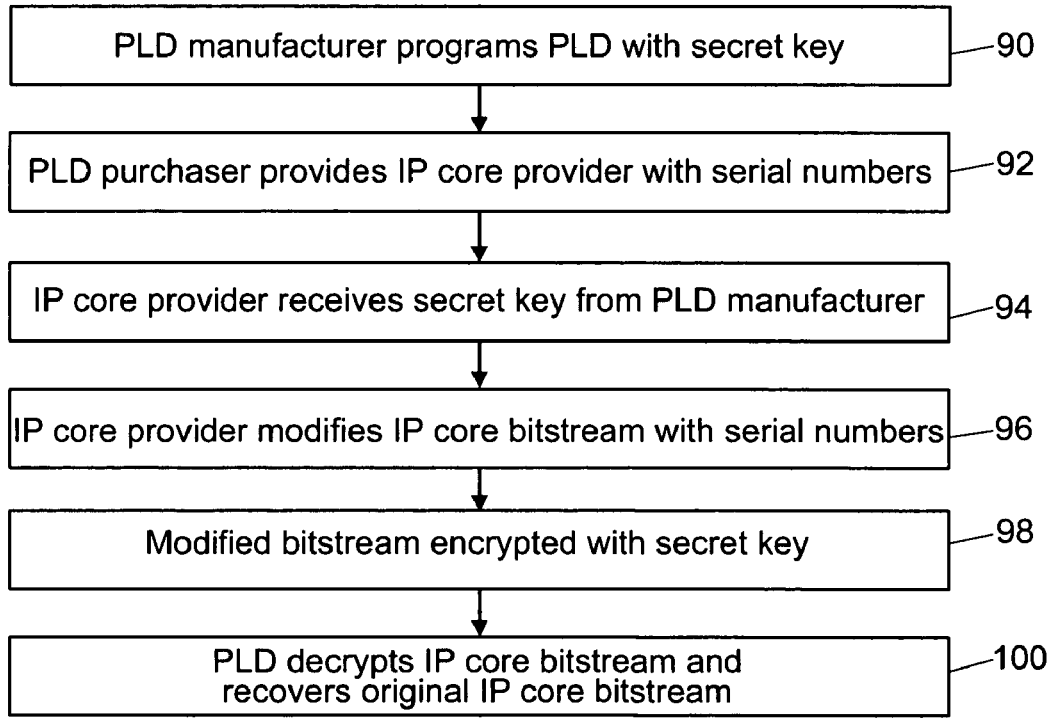
FIG. 7 is a flow diagram of a private key encryption method in according to the present invention.

In a third method described with respect to a flow diagram in FIG. 7 according to the present invention, a private key method is employed that does not directly involve the IP provider in setting the secret decryption key within the PLD. In this method, the serial numbers that are resident in each PLD are employed. At step 90, the manufacturer of the PLD, in this method, programs each PLD device with a secret key. When a system designer purchases the PLDs from the manufacturer and wishes to incorporate a third party IP core, at step 92, he supplies the serial numbers of the devices to the IP core provider. At step 94, the IP core provider contacts the PLD manufacturer for the secret key associated with the serial numbers supplied by the PLD purchaser. At step 96, the IP core provider then modifies the IP core bit stream with the serial number, by for example performing an exclusive XOR with the IP core bit stream and the serial number. At step 98, the modified IP core bit stream is then encrypted with the secret key. In the FPGA, at step 100, the modified IP core bit stream is decrypted and then exclusive XORed with the resident serial number to recover the original IP core bit stream.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of secure delivery of configuration data of an intellectual property (IP) core including the steps of:
   loading configuration data for the IP core into an IP core space by an IP core provider;
   masking portions of said IP core space not loaded with configuration data in said loading configuration data step by said IP core provider;
   encrypting all data in said IP core space by said IP core provider;
   loading configuration data for a system design other than for the IP core into a remainder space and any unused portions of said IP core space by a system designer; and
   masking portions of said IP core space loaded in said loading configuration data step used by said IP core provider in said masking portions of said IP core space not loaded step.

2. A method of secure delivery of configuration data of an intellectual property (IP) core as in claim 1 further including the steps of:
   loading a configuration register in a programmable logic device (PLD) with a same masking value employed in said masking portions of said IP core space not loaded;
   decrypting said IP core space by said PLD with a secret key programmed into said PLD;
   performing either an AND operation with said decrypted IP core space bit stream and data in said configuration register and storing a result in said configuration register when said masking value employed in said masking portions of said IP core space not loaded is a 1 or an OR operation with the decrypted IP core space bit stream and data in said configuration register and storing a result in said configuration register when said masking value employed in said masking portions of said IP core space not loaded is a 0; and
   performing either an AND operation with said configuration space bit stream and data in said configuration register and storing a result in said configuration register when said masking value employed in said masking portions of said IP core space not loaded is a 1 or an OR operation with said configuration space bit stream and data in said configuration register and storing a result in said configuration register when said masking value employed in said masking portions of said IP core space not loaded is a 0.

3. A method of secure delivery of configuration data of an intellectual property (IP) core as in claim 1 further including the steps of:
   identifying portions of said IP core space representing ports into the IP core and unused portions of the IP core space by said IP core provider; and
   providing information identifying said ports and said unused portions to said system designer.

4. A method of secure delivery of configuration data of an intellectual property (IP) core including the steps of:
   loading configuration data for the IP core into an IP core space by an IP core provider;
   masking portions of said IP core space not loaded with configuration data in said loading configuration data step with either the value 0 or 1 by said IP core provider;
   encrypting all data in said IP core space by said IP core provider;
   loading configuration data for a system design other than for the IP core into a remainder space and any unused portions of said IP core space by a system designer;
   masking portions of said IP core space loaded in said loading configuration data step with either the value 0 or 1 used by said IP core provider in said masking portions of said IP core space not loaded step; and
   encrypting data in a configuration space by said system designer.

5. A method of secure delivery of configuration data of an intellectual property (IP) core as in claim 4 further including the steps of:
   loading a configuration register in a programmable logic device (PLD) with a same masking value employed in said masking portions of said IP core space not loaded;
   decrypting said IP core space by said PLD with a secret key programmed into said PLD;
   performing either an AND operation with said decrypted IP core space bit stream and data in said configuration register and storing a result in said configuration register when said masking value employed in said masking portions of said IP core space not loaded is a 1 or an OR operation with the decrypted IP core space bit stream and data in said configuration register and storing a result in said configuration register when said masking value employed in said masking portions of said IP core space not loaded is a 0;
   decrypting said configuration space by said PLD with a secret key programmed into said PLD; and
   performing either an AND operation with said decrypted configuration space bit stream and data in said configuration register and storing a result in said configuration register when said masking value employed in said masking portions of said IP core space not loaded is a 1 or an OR operation with said decrypted configuration space bit stream and data in said configuration register and storing a result in said configuration register when said masking value employed in said masking portions of said IP core space not loaded is a 0.

6. A method of secure delivery of configuration data of an intellectual property (IP) core as in claim 4 further including the steps of:
   identifying portions of said IP core space representing ports into the IP core and unused portions of the IP core space by said IP core provider; and
   providing information identifying said ports and said unused portions to said system designer.

7. A method of secure delivery of configuration data of an intellectual property (IP) core including the steps of:
   encrypting data in an IP core space by an IP core provider;
   identifying portions of said IP core space representing ports into the IP core and unused portions of the IP core space by said IP core provider; and
   providing information identifying said ports and said unused portions to a system designer.

8. A method of controlling use of an intellectual property (IP) core including the steps of:
   programming a desired number of programmable logic devices with a private decryption key by a programmable logic device manufacturer;
   providing a purchaser of said devices a public encryption key;
   transferring said public key from said purchaser to an IP core provider to encrypt an IP core; and
   providing a database by said programmable logic device manufacturer indicating said desired number of programmable logic devices that have been programmed with said private decryption key.

9. A method of controlling use of an intellectual property (IP) core including the steps of:
programming programmable logic devices by a manufacturer with a secret key;
supplying serial numbers of said devices by a purchaser of said devices to an IP core provider;
obtaining from said manufacturer said secret key by said IP core provider;
modifying the IP core bit stream with said serial numbers; and
encrypting said modified IP core bit stream with said secret key.

10. A method of controlling use of an intellectual property (IP) core as in claim 9 further including the steps of:
decrypting said IP core bit stream in said devices; and
extracting said resident serial number from said decrypted IP core bit stream to recover the IP core bit stream.

* * * * *